United States Patent

Jones

[15] 3,687,256

[45] Aug. 29, 1972

[54] OPTICAL BAR CODE PARALLEL PRINTER

[72] Inventor: Clarence L. Jones, Kettering, Ohio

[73] Assignee: The National Cash Register Company, Dayton, Ohio

[22] Filed: April 15, 1970

[21] Appl. No.: 28,624

[52] U.S. Cl. ....................197/1 R, 101/368

[51] Int. Cl. ....................B41j 1/22

[58] Field of Search .......197/1, 1.5; 101/368, 42, 43, 101/109, 201; 340/146.3; 235/61.11

[56] References Cited

UNITED STATES PATENTS

| | | | |
|---|---|---|---|
| 3,340,982 | 9/1967 | Torley et al. | 197/1 |
| 2,566,290 | 8/1951 | Murray | 101/368 X |
| 2,784,668 | 3/1957 | Poje | 101/368 X |
| 3,486,006 | 12/1969 | Siegel | 197/172 X |
| 3,340,984 | 9/1967 | Smith | 197/1 |
| 3,340,983 | 9/1967 | Halverson | 197/1 |
| 2,947,357 | 8/1960 | Bafour et al. | 197/1.5 |
| 3,253,543 | 5/1966 | Lippard | 101/426 |
| 1,879,982 | 9/1932 | Hardy | 101/368 |
| 3,478,682 | 11/1969 | Funahashi | 101/368 |
| 2,879,876 | 3/1959 | Palmer et al. | 197/16 |

*Primary Examiner*—Robert E. Pulfrey
*Assistant Examiner*—R. T. Rader
*Attorney*—Louis A. Kline, Wilbert Hawk, Jr. and Richard W. Lavin

[57] ABSTRACT

A low-cost printing apparatus for recording data according to a predetermined color bar code on a record medium. The printer apparatus includes a print head composed of a plurality of print elements assembled together, the print elements having opposite or adjacent edge portions each of which contains type elements which print bars in different sequences and in different colors. To complete the printing of a code on a record medium, the print head prints one color with one edge and is then rotated to print a second time, using the other edge, with another color, the recording of the data being completed by the printing with both edges.

1 Claim, 3 Drawing Figures

INVENTOR
CLARENCE L. JONES

BY Louis A Kline
Wilbert Hawk, Jr.

HIS ATTORNEYS

INVENTOR
CLARENCE L. JONES

BY Louis A Kline
Wilbert Hawk, Jr.
Richard W Lavin
HIS ATTORNEYS

OPTICAL BAR CODE PARALLEL PRINTER

BACKGROUND OF THE INVENTION

This invention relates to a low-cost apparatus for recording data on a record medium. The record medium produced by the apparatus of this invention may be used in semi-automatic, mark-sensing systems for check-out counter applications in super-markets and retail department stores, credit card and inventory control applications, and the like. The record medium may be attached to an item to be sold, for example, and the medium is read during the sale thereof by a hand-held, optical probe scanner, which is "scribed," or glided, across the medium. One optical probe scanner is shown in U.S. Pat. No. 3,238,501, issued Mar. 1, 1966, on the application of Stephen M. F. Mak, Alfred S. Tauber, and Samuel G. Lebow.

The record medium produced by the apparatus of this invention utilizes three different indicia, with a first indicium and a second indicium being recorded on one surface of the record medium, which surface is utilized for the third indicium. The finished form of the record medium, as disclosed, utilizes printed strips of bars, of first and second colors, which are printed in parallel relationship on one surface of the record medium. The coded record medium uses transitions of color to define a binary logic state like a "one" or a "zero" rather than using a first color to always define a first binary state and a second color to always define a second binary state, as is done in the prior art. The use of transitions of color on the record medium obviates the need for a separate clocking arrangement thereon, and considerably reduces the size of the record medium compared to those of the prior art.

Because of the use of a transition code, complex and costly logic devices are needed to control the printing apparatus to produce a record medium at a high-volume output in order to justify its cost. The present embodiment is directed towards a low-volume output where the equipment is simple in operation and low cost is the main requirement.

SUMMARY OF THE INVENTION

This invention relates to a low-cost hand-operated printing apparatus for recording data on a record medium according to a predetermined code. The apparatus includes a printing head comprising a plurality of printing elements, each having opposed printing surfaces containing complementarily located indicia printing elements. By rotating the printing head between successive printing operations, a machine-readable encoded record medium is produced.

DETAILED DESCRIPTION OF THE PREFERRED EMBODIMENT

Figure 2:
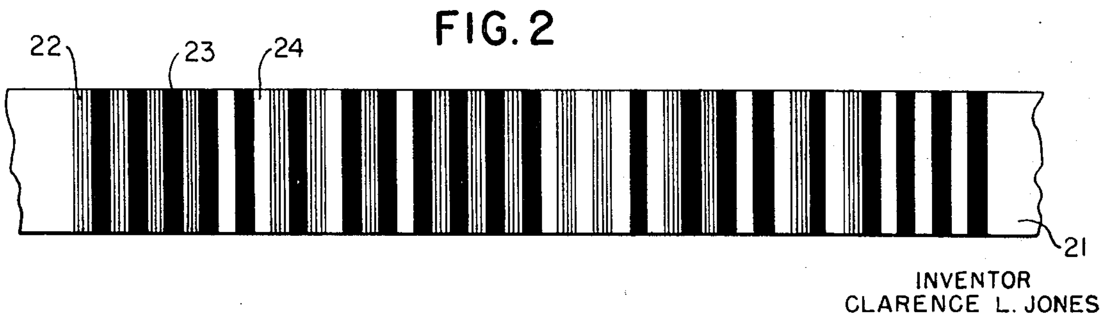
FIG. 2 is a plan view of a color-coded record tag, showing the arrangement of the various color bars which are utilized to store data on the tag.

The present invention is directed to a low-cost, manually-operated printing mechanism for printing data in the form of coded color bars on a label. The data-encoded label 21 (FIG. 2) consists of a plurality of contiguous color bars, each color bar being one color of three or more colors and of a color different from the color of its neighboring colored bars. The colors that are employed in the label 21 are green 22, black 23, and white 24. The green and black colored bars are printed over a white background, so that the white colored bars are defined by areas where no green or black colored bars are printed. The label is encoded, so that it may be read by a sensing probe which travels over the label either in a forward direction or in a reverse direction. The data encoded on the label is in the form of data digits or characters where a data digit consists of four data bits and each data bit is represented by a transition from one colored bar to another colored bar.

The transition code utilized in the present embodiment is disclosed fully in the concurrently-pending U.S. patent application of John B. Christie, Ser. No. 837,850, filed June 30, 1969, entitled "Transition Code Recognition System," which also is assigned to the assignee of the present invention.

As disclosed in that application, the binary digit or character of "one" is represented by the reading of a color transition from black to white, white to green, and green to black. The binary digit "O" is represented by the color transition of black to green, green to white, and white to black. thus, there are three different color transition combinations which an be used for each binary digit. In the data system utilized in the present embodiment, 16 different characters can be printed. Thus, the printer must have a capability of printing 48 different combinations or transitions of colored bars.

Figure 1:
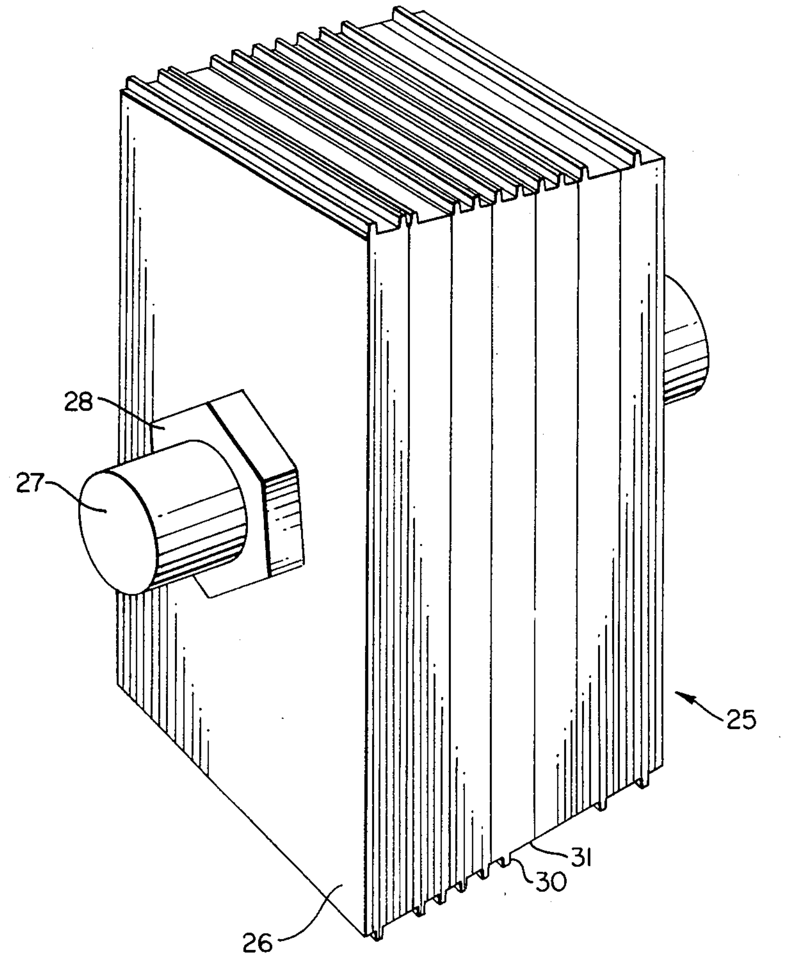
FIG. 1 is an oblique detailed view of the printing head utilized in the printing apparatus, which comprises a plurality of printing elements each having type bars located on their opposite ends.

Referring now to FIG. 1, there is shown the printing head 25 that is utilized in the present printing apparatus. The printing head is composed of any number of printing elements 26, which are assembled on a threaded shaft 27 and held together by nuts 28. Each of the printing elements is a square or rectangular metal plate 0.060 inch thick. The printing surfaces of the printing elements consist of two edges. These could be the opposite edges, as shown in FIG. 1, or adjacent edges. Each printing edge is divided into four equal 0.015-inch-wide areas. These areas are raised 30 (FIG. 1) or recessed 31, depending on whether a printed bar or a space is required at that location. One printing edge of the element 26 is used to print the black bars for a specific character, while the second edge is used to pring the green bars for the same specific character. The use of the same element to print both colors eliminates the impossible registration problem that would exist if separate elements were used for black and green printing.

As disclosed previously, each character to be printed has three possible transition sequences. For 16 characters, this would normally require 48 different sequences and, therefore, 48 different printing elements. Actually, only seven different printing elements 26, which are shown in FIG. 1, are required. First, each printing element can be used twice, since, for example, an element that prints a code that begins with a white space signifies one character when preceded by black bar, and a different character when preceded by a green bar. Second, each element can be used in four different orientations. This means that, by reversing and rotating the printing element, eight different bar sequences or characters can be printed. Therefore, it has been found that only seven different elements are required to print all 48 required bar sequences. Three additional elements would be required to provide the start and stop codes at each end of the printed field.

Figure 3:
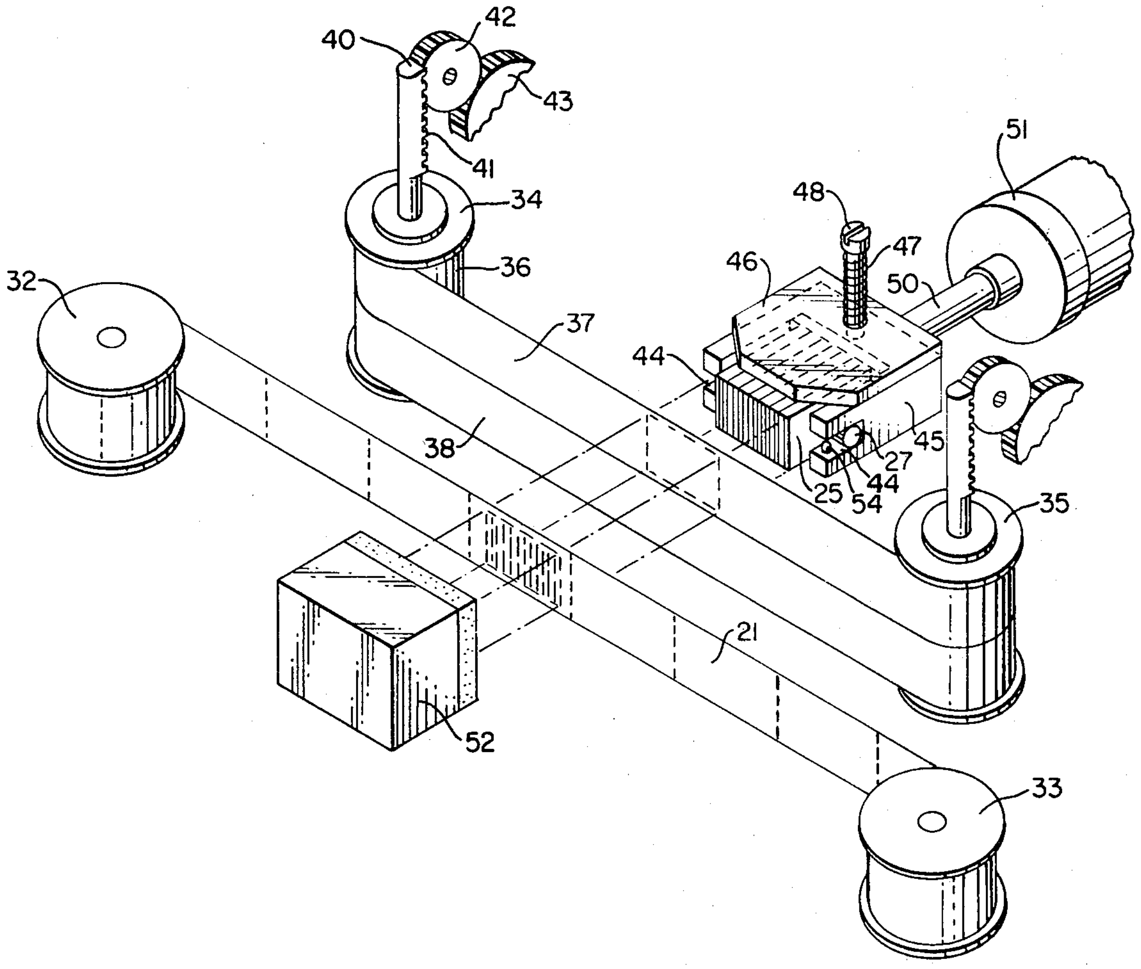
FIG. 3 is a partial exploded view of the printing mechanism used in the present embodiment to print data on a record tap using a color-bar transition code.

Referring now to FIG 3, there is shown a partial exploded view of the printer, using the printing elements disclosed previously to print a multi-colored bar code on a label or a tag. Included in the mechanism are a supply reel 32 and a takeup reel 33 supporting a roll of labels 21, on which is to be encoded information in the form of colored bars. Positioned adjacent to the reels 32, 33 is a second set of takeup 34 and supply 35 reels, which support the roll of a two-sectional printing ribbon 36. One section 37 of the ribbon is black, while the other section 38 of the ribbon is green. Each of the reels 34, 35 is rotatably supported on a shaft 40, which in turn is slidably mounted for vertical movement within a supporting member (not shown). The upper end of the shaft 40 contains a number of gear teeth 41, which are engaged by a gear member 42. A driving gear 43, which can be manually operated or driven by a motor, engages the gear 42. Operation of the gear 43 shifts the ribbon 36 to move either one of the black 37 or green 38 sections of the ribbon to a printing position, as will be described more fully hereinafter.

The assembled printing head 25 is rotatably positioned within a pair of slots 44 of a fork member 45 by means of the shaft 27. A plate member 46 is mounted on the top portion of the fork member 45 and is resiliently held in position by a spring 47 located on an elongated screw 48 mounted on the fork member 45 and extending through a hole located in the plate member 46. The spring 47 allows the plate member 46 to be pulled up a distance sufficient to allow the printing head 25 to be rotated upon the shaft 27.

The fork member 45 is attached to one end of a piston 50 of an actuating member 51. The actuating member 51 may be hydraulically or pneumatically operated. A platen 52, having a face portion 53 composed of a rubber-type material, is positioned adjacent the roll of labels 21 and opposite the printing head 25.

In the operation of the printer, the operator will select, and position in proper sequence, the printing elements 26 (FIGURE 1) necessary to print the characters required. After the printing elements 26 have been assembled on the shaft 27, the printing head is slipped into the fork member 45. An abutment 54 (FIGURE 3), located on each slot 44, retains the printing head 25 within the slots 44. Depending on what edge of the printing head 25 is in position to be printed, the printing ribbon 36 is shifted through the operation of the gears 42, 43 to position either the black section 37 or the green section 38 adjacent to the printing head 25. The actuating member 51 is released for operation, and a number of colored bars are printed on one of the labels 21 by the action of the printing head 25 against the platen 52. The printing head is then returned to its home position by the actuating member 51. The plate 46 is then lifted against the action of the spring 47, and the printing head 25 is rotated on the shaft 27 to bring the other edge of the head to a printing position. The ribbon 36 is then shifted to bring the second color portion into a printing position. The actuating member 51 is then again operated, and the encoding of the label 21 is completed.

The reels 32, 33 are then operated to bring a new label blank into a printing position. The ribbon 36 is then advanced to position a fresh portion adjacent the printing head. If the same information is to be printed again, the operation of the printing head is repeated. If new information is to be printed, the printing head 25 is removed from the fork member 45, and the printing elements 26 are replaced in a manner described previously to provide a new coded sequence of colored bars. The printing operation is then repeated as described previously.

It will be seen from this construction that the printing operation is quite simple and therefore low in cost. The unique printing elements which constitute the printing head provide a very simple method for obtaining proper registration of the colored bars with respect to each other, since the transition from one color to another is the basis of the code used to encode the information on the label.

What is claimed is:

1. In an apparatus for recording data in the form of a plurality of predetermined positioned contiguous colored indicia on a record medium where each colored indicium is of a color different from the color of its adjacent colored indicia:

a. means for moving a record medium in a feeding direction to a printing position;

b. a multi-color section printing ribbon shiftably mounted adjacent said record medium, said ribbon adapted to be shifted between two positions in a direction transverse to the feeding direction of said record medium to position a single color portion of the ribbon adjacent said record medium;

c. means for shifting said printing ribbon between said two positions;

d. a slidably mounted support member positioned adjacent said printing ribbon;

e. a print assembly rotatably mounted on said support member, said print assembly comprising a plurality of printing elements each representing a character of data and having opposed end printing surfaces, the opposed printing surfaces of each printing element having complementarily-positioned indicia type elements located thereon which coact together with a different color portion of said printing ribbon to print the character of data of the printing element in the form of a plurality of predetermined positioned contiguous colored indicia when the opposed printing surfaces, upon rotation of said print assembly, are brought into registration with the same record medium portion on successive printing operations with different color sections of said ribbon;

f. actuation means engaging said support member for moving said support member to a position where said print assembly engages said printing ribbon and the record medium to print one set of indicia in a predetermined color;

g, and means for operating said shifting means to position a different color section of said ribbon in printing position without feeding said ribbon, means to rotate said print assembly to align the opposed printing surfaces of the print elements with said ribbon, said actuating means subsequently moving said support member to engage said printing ribbon and the same portion of the record medium to print a second set of indicia on said record medium in a second predetermined color with portions of said second set of indicia being positioned between portions of said one set of indicia.

* * * * *